(12) United States Patent
Ryan et al.

(10) Patent No.: US 6,175,897 B1
(45) Date of Patent: Jan. 16, 2001

(54) SYNCHRONIZATION OF BRANCH CACHE SEARCHES AND ALLOCATION/ MODIFICATION/DELETION OF BRANCH CACHE

(75) Inventors: Charles P. Ryan, Phoenix, AZ (US); Patrice Brossard, Boulogne (FR)

(73) Assignee: Bull HN Information Systems Inc., Billerica, MA (US)

( * ) Notice: Under 35 U.S.C. 154(b), the term of this patent shall be extended for 0 days.

(21) Appl. No.: 09/221,560

(22) Filed: Dec. 28, 1998

(51) Int. Cl.$^7$ .................................................. G06F 12/00
(52) U.S. Cl. ......................... 711/119; 711/125; 711/137; 711/140; 712/233
(58) Field of Search .................................... 711/125, 137, 711/140, 118, 119; 712/23, 205, 207, 233, 227, 238, 239

(56) References Cited

U.S. PATENT DOCUMENTS

| | | | |
|---|---|---|---|
| 4,707,784 | * 11/1987 | Ryan et al. | 711/140 |
| 4,777,594 | * 10/1988 | Jones et al. | 712/240 |
| 5,506,976 | * 4/1996 | Jaggar | 712/238 |
| 5,592,634 | * 1/1997 | Cirrcello et al. | 712/239 |
| 5,664,135 | * 9/1997 | Schlansker et al. | 712/201 |
| 5,778,245 | * 7/1998 | Papworth et al. | 712/23 |
| 5,930,492 | * 7/1999 | Lynch | 712/216 |
| 6,065,091 | * 5/2000 | Green | 711/3 |

* cited by examiner

Primary Examiner—Eddie P. Chan
Assistant Examiner—Hong Kim
(74) Attorney, Agent, or Firm—J. H. Phillips; B. E. Hayden; J. S. Solakian

(57) ABSTRACT

A cache used with a pipelined processor includes an instruction cache, instruction buffers for receiving instruction sub-blocks from the instruction cache and providing instructions to the pipelined processor, and a branch cache. The branch cache includes an instruction buffer adjunct for storing an information set for each sub-block resident in the instruction buffers. A branch cache directory stores instruction buffer addresses corresponding to current entries in the instruction buffer adjunct, and a target address RAM stores target addresses developed from prior searches of the branch cache. A delay pipe, constituting serially-coupled registers, is used to step an information set read from the buffer instruction adjunct in synchronism with a transfer instruction traversing the pipeline. A comparison, at a predetermined phase along the delay pipe, determines if the information set identifies, as currently resident in the instruction buffers, a target address that matches the target address in the transfer instruction traversing the pipeline. If there is a finding that the information set did identify a target address in the instruction buffers that matches the target address in the transfer instruction traversing the pipeline and there is a TRA-GO from the pipeline, the instruction identified by the target address is sent to the pipeline from the instruction buffers rather than from the instruction cache.

32 Claims, 11 Drawing Sheets

SYNCHRONIZATION OF BRANCH CACHE SEARCHES AND ALLOCATION/ MODIFICATION/DELETION OF BRANCH CACHE

FIELD OF THE INVENTION

This invention relates to pipelined computer central processors and their support logic structure. More particularly, this invention relates to a private cache associated with each processor and which incorporates a specially-configured branch cache for increasing the average efficiency and speed in handling transfer instructions in the pipeline which may be subject to a transfer go condition.

BACKGROUND OF THE INVENTION

As faster operation of computers has been sought, numerous hardware/firmware features have been employed to achieve that purpose. One widely incorporated feature directed to increasing the speed of operation is pipelining in which the various stages of execution of a series of consecutive machine level instructions are undertaken simultaneously. Thus, in a simple example, during a given time increment, a first stage of a fourth (in order of execution) instruction may be carried out while a second stage of a third instruction, a third stage of a second instruction and a fourth stage of a first instruction are all performed simultaneously.

Pipelining dramatically increases the apparent speed of operation of a computer system. However, it is well known that the processing of a transfer (sometimes called a branch) instruction when it is necessary to find a target (i.e., when the conditions calling for a transfer are met) temporarily slow down processing while the target instruction is found in the cache. Even when an instruction cache is provided, the target must be found and processed before it can be sent to the pipeline. It is to significantly speeding up the average rate of servicing transfer operations that the present invention is directed.

SUMMARY OF THE INVENTION

The environment of the invention is within a data processing system having a pipelined processor and a cache which includes an instruction cache, instruction buffers for receiving instruction sub-blocks from the instruction cache and providing instructions to the pipelined processor, and a branch cache. The branch cache includes an instruction buffer adjunct for storing an information set for each of sub-blocks which are currently resident in the instruction buffers. The information set includes a search address, a predicted transfer hit/miss, a projected location of a target in a sub-block and a predicted target address and may include additional information. A branch cache directory stores instruction buffer addresses corresponding to current entries in the instruction buffer adjunct, and a target address RAM stores target addresses developed from prior searches of the branch cache. A delay pipe is used to selectively step an information set read from the buffer instruction adjunct in synchronism with a transfer instruction traversing the pipeline. The delay pipe is a plurality of serially coupled registers including: a) a first register for receiving an instruction set from the buffer instruction buffer adjunct concurrently with the issuance of a transfer instruction from the instruction buffers to the pipeline during a first pipeline phase; b) a second register for receiving the instruction set from the first register during a second pipeline phase which is later than the first pipeline phase; and c) a third register for receiving the instruction set from the second register during a third pipeline phase which is later than the second pipeline phase.

A comparison, during the third pipeline phase, determines if the information set identifies, as currently resident in the instruction buffers, a target address that matches the target address in the transfer instruction traversing the pipeline. If there is a finding that the information set traversing the delay pipe identifies a target address in the instruction buffers that matches the target address in the transfer instruction traversing the pipeline and there is an indication of TRA-GO from the pipeline, the instruction identified by the target address is sent to the pipeline from the instruction buffers rather than from the instruction cache, a faster operation. If there is not such a finding, the instruction is sent to the pipeline from the instruction cache. Preferably, the sub-blocks stored in the instruction buffers are four instruction words in length.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Figure 1:
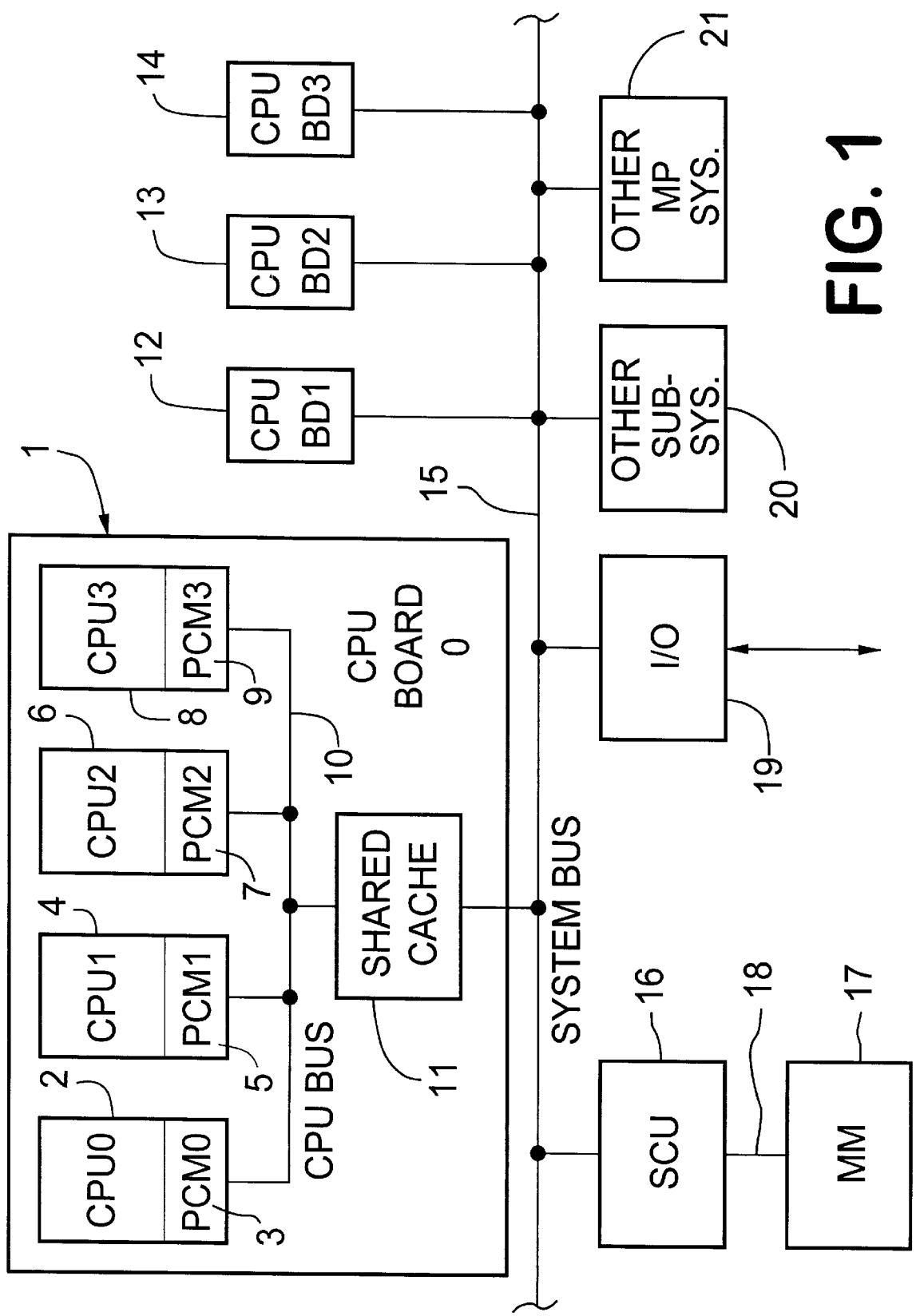
FIG. 1 is a high level block diagram of an multiprocessor computer system which is an exemplary environment for practicing the invention.

Attention is first directed to FIG. 1 which is a high level block diagram of an exemplary multiprocessor computer system incorporating the invention. A first CPU board (CPU Board "0") 1 includes four central processor units 2 (CPU "0"), 4 (CPU "1"), 6 (CPU "2"), 8 (CPU "3"). Each of the central processor units 2, 4, 6, 8 situated on the first CPU board 1 includes an integral private cache memory module, 3, 5, 7, 9, respectively. The private cache modules 3, 5, 7, 9 are each configured as "store into"; i.e., the results of each completed operation performed in the CPU are stored into the private cache. Each of the private cache modules 3, 5, 7, 9 on CPU Board "0" 1 interface with a CPU bus 10 for direct communications between the CPUs 2, 4, 6, 8.

In the exemplary system, there are three additional CPU boards 12 (CPU Board "1"), 13 (CPU Board "2") and 14 (CPU Board "3"), each of which is substantially identical to CPU board 1 although those skilled in the multiprocessor art will understand that each CPU board and each CPU on each of the boards is assigned a unique identification number to facilitate communication and cooperation among the CPUs in the system.

CPU board 1 (i.e., CPU Board "0") also includes a shared cache 11 disposed between ("bridging") the CPU bus 10 and a system bus 15. It will be understood that each of the CPU boards 12, 13, 14 also each includes a CPU bus and a shared cache, identically oriented.

A system control unit 16 serves to couple the system bus 15 to a main memory unit 18 via a memory bus 17. In addition, one or more input/output units 19 interface the system bus 15 with various input/output subsystems, not shown, to achieve input/output functions on a system basis, all as well known to those skilled in the art. Similarly, other subsystems 20, not otherwise specified or shown, may be connected to the system bus 15 to complete a given multiprocessor system, and other, complete, multiprocessor systems, represented by the block 21, may also communicate with the multiprocessor system depicted in FIG. 1 via the system bus 15. System control unit 16 also conventionally provides a multi-phase clock to all the system units.

Figure 2:
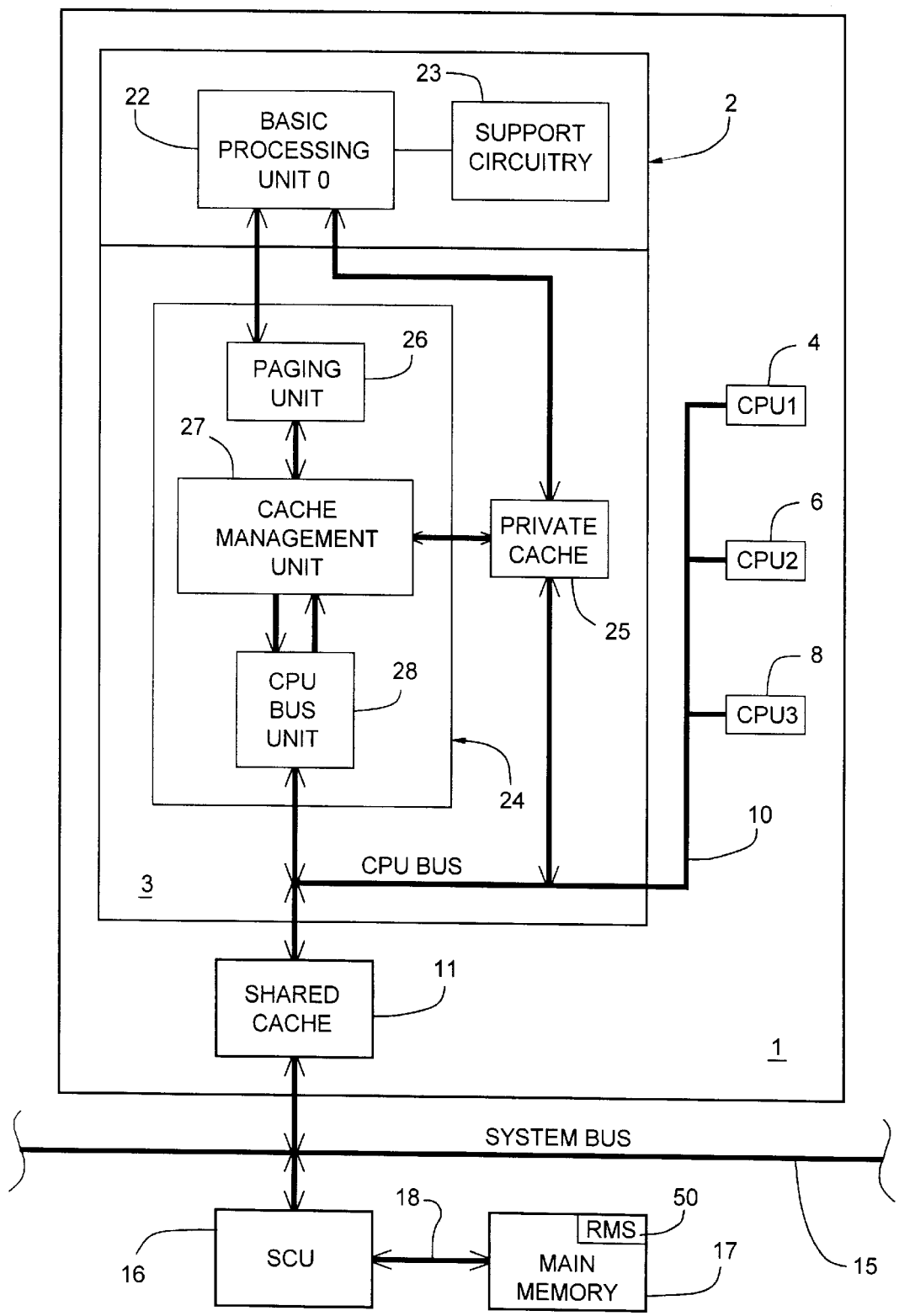
FIG. 2 is a slightly lower level block diagram showing additional details of an exemplary CPU board in the multiprocessor system of FIG. 1.

FIG. 2 is a slightly lower level block diagram of CPU "0" 2 of CPU board 1 (CPU Board "0") illustrating additional structure which is present in each CPU in the system. CPU "0" 2 includes a basic processing unit (BPU) 22 and BPU control and support circuitry 23 therefor.

As previously described, CPU "0" 2 also includes private cache module "0" 3 which constitutes a cache control unit 24 and a private cache 25 (which itself includes additional logic to be described below). Cache control unit 24 includes paging unit 26, cache management unit 27 and CPU bus unit 28. Paging unit 26 interfaces with basic processing unit "0" 22 and cache management unit 27. Cache management unit 27 also interfaces with private cache memory 25 and CPU bus unit 28. CPU bus unit also interfaces with CPU bus 10 and, via CPU bus 10, shared cache 11. Private cache 25 is also coupled directly to receive information from and send information to the CPU bus 10 and to receive information from and send information to BPU "0" 22.

As previously described, shared cache 11 also interfaces with system bus 15 and, via system bus 15, with system control unit 16 and other systems/subsystems shown in FIG. 1. Main memory 17 may be accessed via the system control unit 16 and memory bus 18.

It will be seen that there are numerous paths for information flow among the various blocks shown in FIGS. 1 and 2. The types of information may include control, address, instructions and operands. A given CPU may directly access its own private cache module and indirectly access the private cache modules incorporated into the other CPUs on a shared CPU board. Thus, CPU "0" 2 can access, via the CPU bus 10, the shared cache 11 it shares with CPU "1" 4, CPU "2" 6 and CPU "3" 8. CPU "0" 2 can also, under defined conditions, access the private cache module of CPU "2" 6 (for example) via the CPU bus 10 to effect a local "siphon". Further, CPU "0" 2 can access (via CPU bus 10, shared cache 11 and system bus 15) the shared caches (not shown) on each of CPU Board "1" 12, CPU Board "2" 13 and CPU Board "3" 14. Still further, a given CPU may indirectly access the private cache modules (not shown) of a CPU (not shown) on another CPU board; e.g., CPU "0" on CPU board 1 (CPU Board "0") may, under defined conditions, access the private cache module of any one of the CPUs on CPU Board "2" 13 (FIG. 1) via CPU bus 10, shared cache 11, system bus 15 and the shared cache on CPU Board "2" to effect a remote "siphon".

Further yet, for example, CPU "0" 2 can access main memory 17 via CPU bus 10, shared cache 11, system bus 15, SCU 16 and memory bus 18. Still further, for example, CPU "0" 2 can access, via CPU bus 10, shared cache 11 and system bus 15, any other block shown coupled to the system bus 15 in FIG. 1 to achieve bilateral communication with input/output devices, other subsystem components and even other multiprocessor systems.

Figure 3:
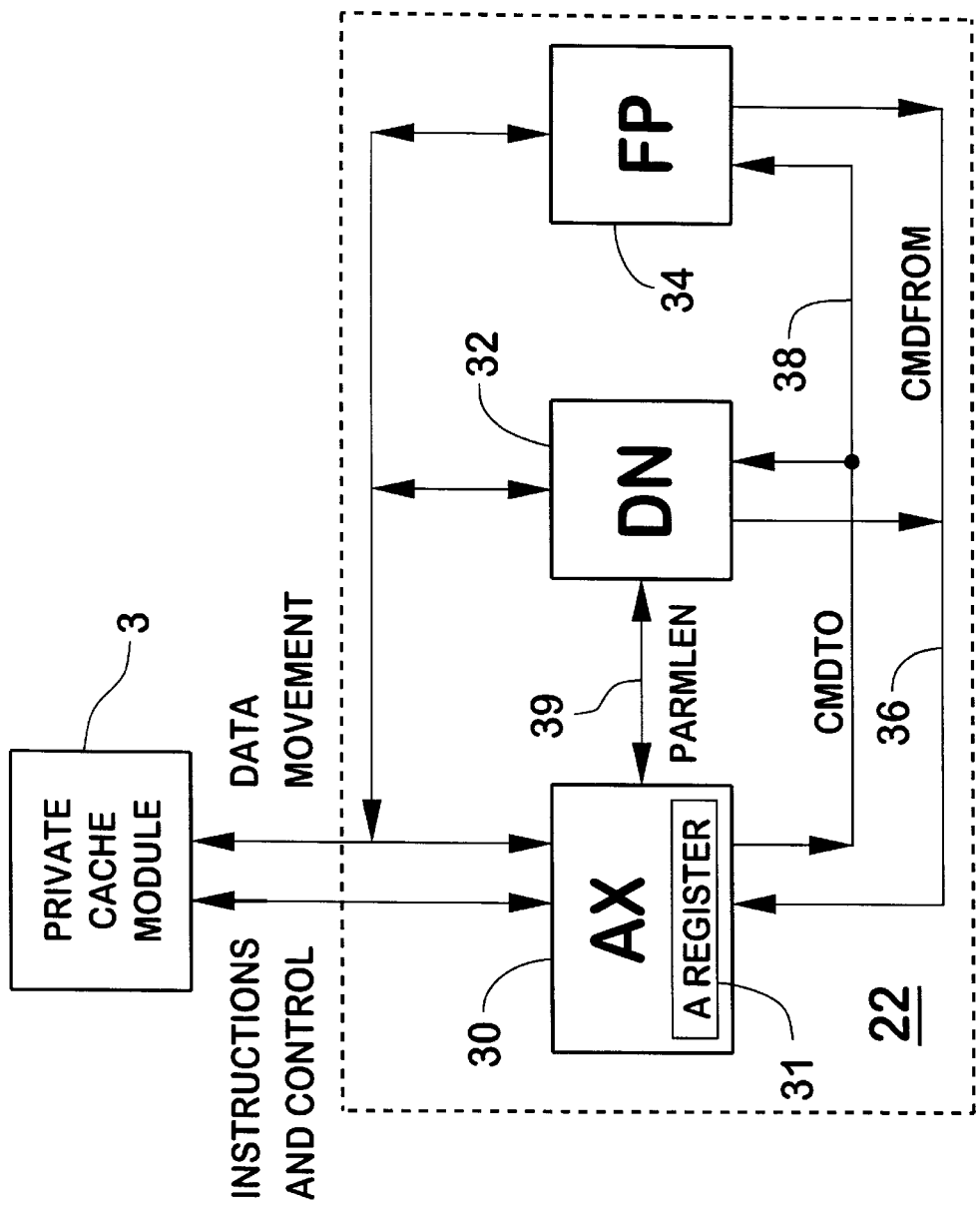
FIG. 3 is a block diagram showing additional details of a basic processing unit (BPU) included within each CPU on the CPU board shown in FIG. 2, each CPU including an address and execution (AX) unit, a decimal numeric (DN) unit, a floating point FP unit and BPU control logic.

FIG. 3 is a block diagram which shows additional details of an exemplary BPU 22 in the CPU 2. An address and execution (AX) unit 30 is a microprocessing engine which performs all address preparation and executes all instructions except decimal arithmetic, binary floating point and multiply/divide instructions. The main functions performed by the AX unit 30, in close alliance with the BPU control logic 23, include:

effective and virtual address formation;
memory access control;
security checks;
register change/use control;
execution of basic instructions, shift instructions, security instructions, character manipulation and miscellaneous instructions; and
control and maintenance of a safestore frame used in conjunction with domain changes and error recovery.

Efficient scientific calculation capability is implemented in a floating point (FP) coprocessor unit 34. The FP unit 34 executes all binary floating point arithmetic. This unit, operating in concert with the AX unit 30, performs scalar or vector scientific processing.

The FP unit 34:

executes all binary and fixed and floating point multiply and divide operations;
computes 12 by 72-bit partial products in one machine cycle;
computes eight quotient bits per divide cycle;
performs modulo 15 residue integrity checks;
executes all floating point mantissa arithmetic;
executes all exponent operations in either binary or hexadecimal format;
preprocesses operands and post-processes results for multiply and divide instructions; and
provides indicator and status control.

A decimal numeric (DN) coprocessor unit 32 performs the execution of decimal numeric Extended Instruction Set (EIS) instructions. It also executes Decimal-to-Binary (DTB), Binary-to-Decimal (BTD) conversion EIS instructions and Move-Numeric-Edit (MVNE) EIS instructions in conjunction with the AX unit 30. The DN unit both receives operands from and sends results to the private cache 3. A CMDTO ("command to") bus 38 and a CMDFROM ("command from") bus 36 couple together the AX unit 30, the DN unit 32 and the FP unit 34 for certain interrelated operations. A PARMLEN bus 39 communicates parameter length information between the AX unit 30 and the DN unit 32 to specify the effective lengths and scales of operands and results.

The AX unit 30 is a pipelined processor in which the various stages of execution of a series of consecutive machine level instructions are undertaken simultaneously in the well known manner. The AX unit 30 includes, in common with most such processors, an accumulator ("A") register 31.

Figure 4:
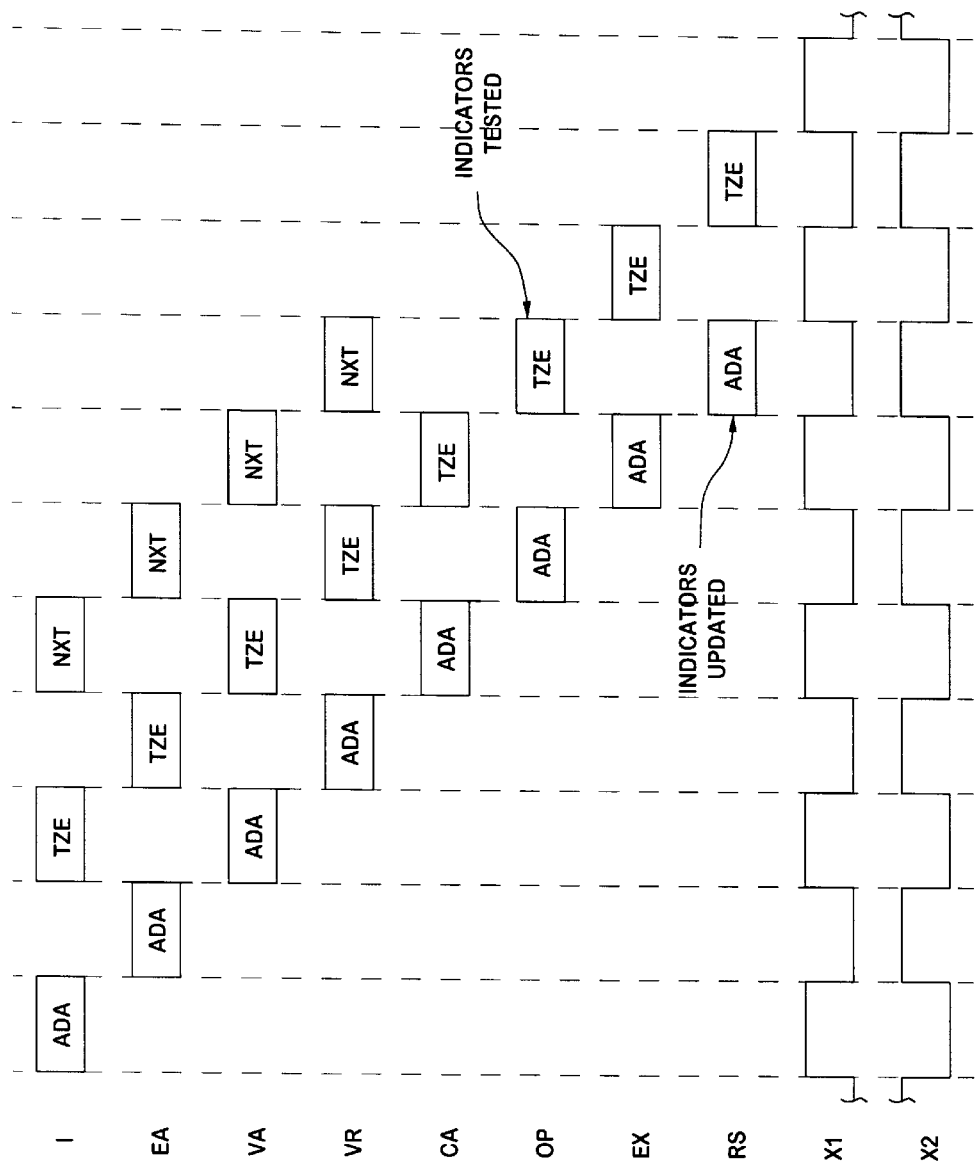
FIG. 4 is a timing diagram showing the relative progress through the pipeline of two exemplary successive instructions in which the results of the first instruction may cause a flag to be set which must be tested by the second instruction.

Referring to FIG. 4, the exemplary AX unit 30 pipeline has eight stages: I (instruction fetch), EA (effective address), VA (virtual address), VR (virtual-to-real address), CA (cache access), OP (operand fetch), EX (execution) and RS (result handling—typically storing the result in the processor's private cache). In the system chosen to illustrate the invention, a two-phase clock (X1, X2) is employed such that the I, VA, CA and EX operations are carried out during X1 while the EA, VR, OP and RS operations are carried out during X2. The EA, VA and VR stages may, in some more simple pipelines, be replaced by a single operand address stage, and, for the purposes of the invention, may be considered as such.

As will be well known to those skilled in the art, a first instruction, the execution of which affects various conditions in the processor, such as the contents of the A register, is often followed by a second instruction which is a conditional transfer (sometimes called conditional branch). The conditional transfer instruction tests one or more indicators which may have been affected by the execution of the first instruction to determine if a conditional transfer ("Go") will be made. In the simple example chosen to illustrate the invention, the first instruction is an ADA which adds the contents of a specified operand stored in the processor's private cache to the current contents of the A register; and the second instruction is a TZE, transfer to a specified instruction stream only if the result of the first instruction leaves the contents of the A register at zero, else execute the next instruction in the current instruction stream. (The next instruction in the pipeline is, for convenience, identified in FIGS. 4 and 5 as "NXT" which does not necessarily specify an actual instruction.)

Thus, as the ADA instruction passes through the pipeline: it is brought into an instruction register during I; the actual address (usually in the processor's private cache) of a specified operand is determined during EA, VA, VR; the operand is addressed during CA and fetched during OP such that the ADA instruction can be executed during EX with the result processed (typically, saved in the private cache) during RS. In the meantime, the TZE instruction is trailing in the pipeline by one full clock cycle (i.e., X1 to X1 and X2 to X2). According to this pipeline timing, the earliest the indicators, including an result=0 indicator, can be ready for testing is after execution of the ADA instruction has been completed; i.e., during RS. However, the next cycle for the TZE instruction is EX such that the test of the result=0 indicator must have been completed before EX is entered; thus, the test of the result=0 indicator must be carried out during OP (there being no need to fetch an operand) for the TZE instruction. As can be readily understood from FIG. 4, this test must therefore be made during the same X2 period in which the ADA instruction results might cause the result=0 indicator to be updated.

Thus, a potential for a logic race would seem to be present, but, in the past, this has not been a problem because the test could be effectively carried out late in the X2 period (even on the trailing edge of the X2 clock pulse) in order to make the GO/NOGO decision for the TZE conditional transfer during its EX (i.e., during the next X1).

However, as clock speed has been increased in order to improve performance as is now possible because of the availability of faster and more dense logic circuitry, the potential logic race becomes a real logic race such that carrying out the test of an indicator during the same clock pulse phase in which the indicator is updated can no longer be reliably carried out. The undesired results are processor faults causing retries which, even if successful, adversely affect system performance. As the clock rate is further increased, a conditional transfer immediately following in the pipeline an instruction which affects an indicator it must test cannot be performed at all.

Figure 5:
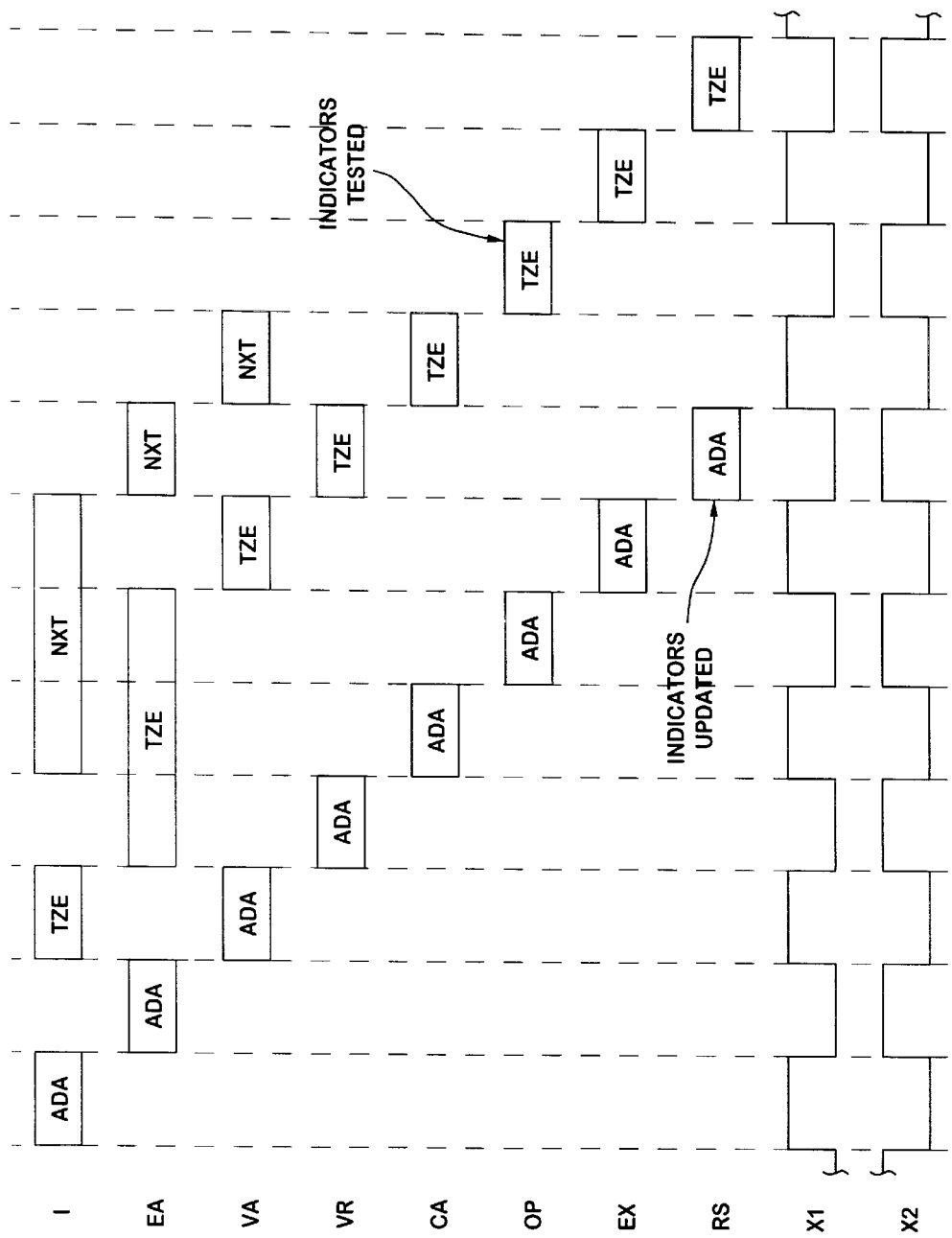
FIG. 5 is a timing diagram similar to FIG. 4, but illustrating the stabilizing effect of an improvement on the relative timing of the two successive instructions through the pipeline;.

Yet, it is neither a suitable remedy to rewrite the software (which may be legacy) to introduce a delay between the two instructions nor to effect a major change to the already highly-developed architecture of the pipeline. However, a pipeline timing improvement avoids such drastic remedies while, at the same time, completely effectively solving this pipeline timing problem. FIG. 5 is a pipeline timing diagram which, like FIG. 4, illustrates the relative pipeline timing of successive ADA and TZE instructions, but taking into account the timing changes brought about by applying the improvement.

More particularly, during the I stage for the TZE, the op code of the previous instruction (ADA in the example) is analyzed to determine if it might affect the indicator the TZE must test. An ADA can affect the carry, overflow, sign and zero indicators, so the analysis confirms that the zero indicator may be changed such that the logic race problem occasioned by speeding up the system clock is present. In response, the analysis logic circuitry (or equivalent firmware) holds the TZE command in EA for a full extra clock cycle; i.e., from the beginning of an X2 through the completion of the next X2. Accordingly, by the time the TZE has cycled through the pipeline to the OP stage at which the indicators are tested, the indicator circuitry will have had one complete additional clock cycle to settle after being updated during RS of the ADA instruction such that the uncertainty created by the logic race has been completely eliminated. Similarly, the I stage of the next ("NXT") instruction is also delayed such that this succeeding instruction will logically follow the conditional transfer instruction through the pipeline.

It might be thought that the intentional delay of the conditional transfer instruction's progress (and that of succeeding instructions) through the pipeline as described above would result in a decrease in system performance. However, such a short term decrease in performance is more than compensated for by the increase in clock speed which can be made. That is, a statistical analysis of the frequency of occurrence in an instruction stream including a successive pair of instructions of which the first instruction affects the indicator tested by the second, conditional transfer, instruction fully supports the overall increase in performance effected by increasing the clock rate. Further, even in marginal, cases, retries due to the incipient logic race problem, which adversely affect system performance even if successful, are virtually eliminated by the use of the present invention.

Figure 6:
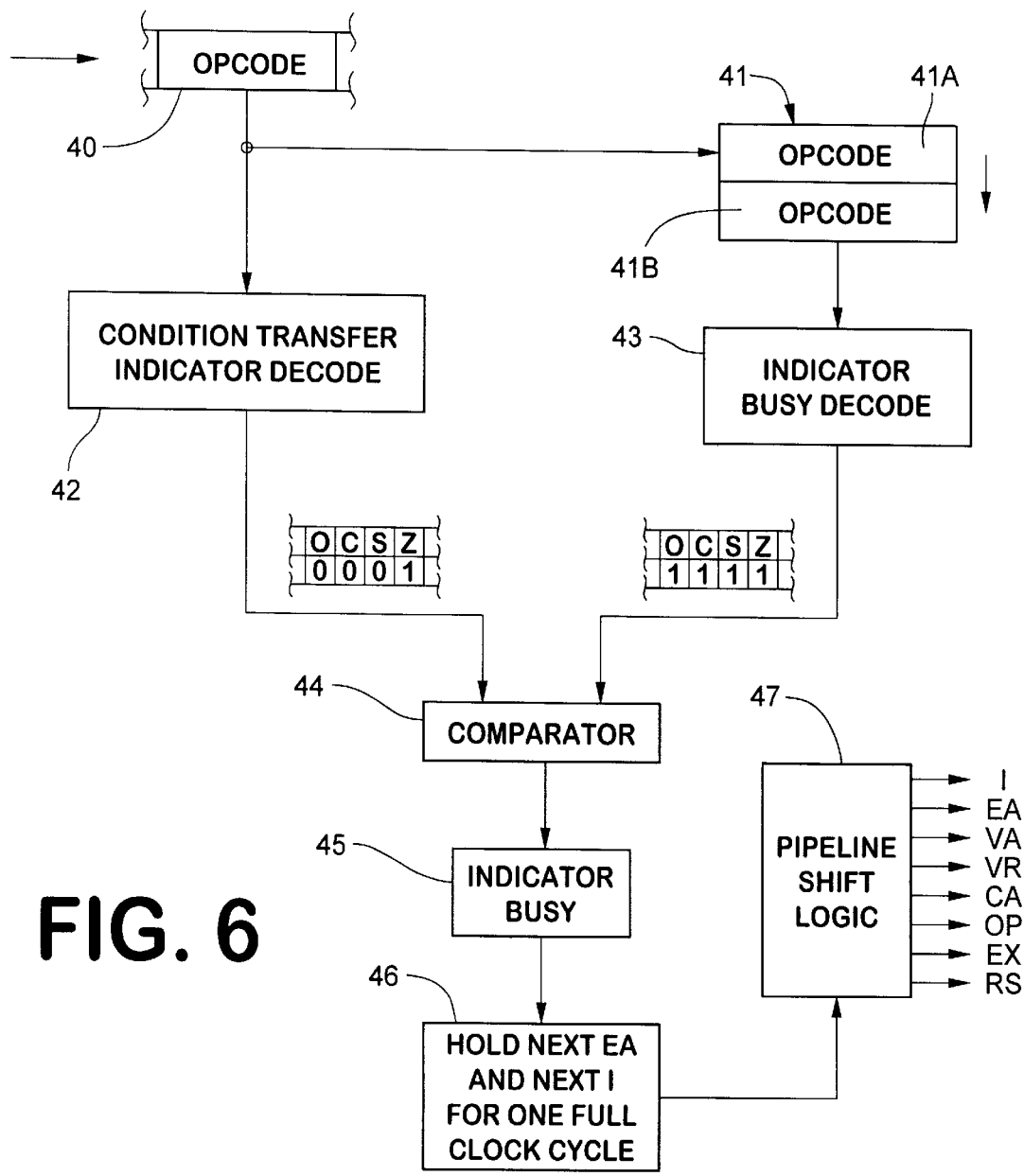
FIG. 6 is a simplified logic diagram illustrating apparatus by which the pipeline timing improvement may be practiced in an established processor configuration.

Attention in now directed to FIG. 6 which is a simplified logic diagram of a hardware implementation of the pipeline timing improvement. The first instruction, ADA in the example, is routinely entered into an instruction register 40 for decoding and to provide other information relevant to its execution such as the identification and storage location of an operand to be employed. In addition, the opcode of the first instruction is saved in a first register 41A of an opcode stack 41. Thus, with respect to the first instruction, the logic shown in FIG. 6 only saves the opcode in the stack 41 during its I stage.

During the succeeding X1, the I stage for the next instruction, TZE in the example, is undertaken. Thus, the TZE instruction is brought into the instruction register 40 for conventional handling, and its opcode is also copied to the top of the opcode stack 41, pushing the opcode for the previous instruction, ADA, down into a second register 41B. Also during I for the TZE instruction, it is identified by condition transfer indictor decode 42 which determines which indicator it is interested in. Thus, from among the overflow, carry, sign and zero indicators, the logic block 42 determines (for example, by a simple table look-up operation or using a decoding logic array) that the conditional transfer instruction (TZE) currently in the instruction register 40 will be testing the zero indicator later in its pipeline cycle.

At the same time, indicator busy decode logic block 43 is performing a similar analysis on the opcode of the ADA instruction which has been pushed down to a second register 41 B in the opcode stack 41. More particularly, indicator busy decode logic block 43 determines that execution of an ADA instruction can modify any of the overflow, carry, sign and zero indicator.

The results obtained by the condition transfer indicator decode logic block 42 and the similar indicator busy decode logic block 43 are compared in a comparator 44 (for example, by straightforward AND-ing in corresponding digit positions), and a determination is made that the instruction ahead of the conditional transfer instruction may cause the indicator of interest (result=0 in the example) to the conditional transfer to be updated. This condition sets an indicator busy flag 45 which, when set, directs logic block 46 to control the pipeline shift logic 47 such that the immediately following EA (i.e., the EA stage for the conditional transfer instruction) is held for one additional full clock cycle and also such that the following I stage (for the "NXT" instruction) is held for one additional full clock cycle. Accordingly, the succeeding pipeline stages for the conditional transfer instruction are postponed as shown in FIG. 5, and the "NXT" instruction is suitably realigned in the pipeline.

While the various logic blocks shown in FIG. 6 represent hardware, those skilled in the art will understand that many, or even all, of their functions can readily be realized by suitably revising the firmware equations controlling the pipeline shift functions. Further, as noted above, a pipeline may have an operand address stage in place of the three address stages, EA, VA and VR, used in the example. Thus, it may be generalized that the hold or delay of the conditional transfer instruction in the pipeline takes place in its operand address stage which may be a single stage or a plurality of sub-stages such as EA, VA and VR as in the example.

The foregoing improvement to the pipeline timing is described and claimed in U.S. patent application Ser. No. 09/187,123, entitled PIPELINED CENTRAL PROCESSOR INCORPORATING INDICATOR BUSY SENSING AND RESPONSIVE PIPELINE TIMING MODIFICATION, by John E. Wilhite, filed Nov. 5, 1998, and assigned to the same assignee as the present invention.

The present invention may be employed in any pipelined processor to statistically improve system performance by incorporating improved and very efficient branch/transfer prediction methods and apparatus. The pipelined processor described above (either version) has been chosen as an exemplary environment to describe the invention.

Figure 7:
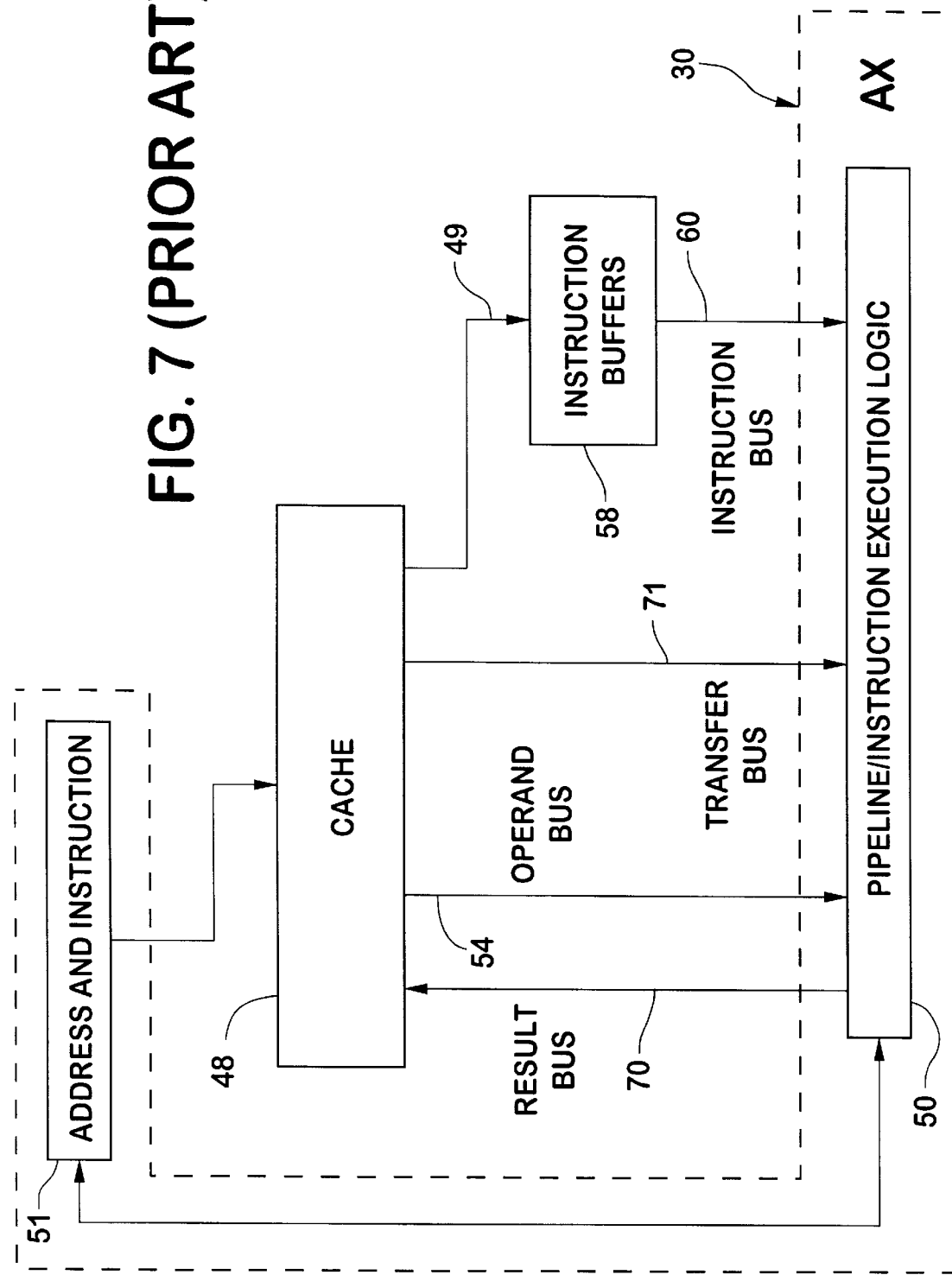
FIG. 7 is a high level block diagram illustrating prior art structure which is replaced by the structure of the present invention.

Attention is now directed to FIG. 7 which is a high level block diagram of the relevant apparatus before the incorporation the subject invention; i.e., the direct prior art. Referring briefly also to FIG. 3, it will be noted that a dashed line in FIG. 7 encloses the AX unit 30 while the remaining structure in FIG. 7 is found in the private cache module 3. Thus, the cache structure shown in FIG. 7 conventionally receives address and instruction information from address and instruction block 51 of the AX 30 unit and sends operands (via operand bus 54), instructions (via instruction bus 60) and transfer information (via transfer bus 71) to pipeline/instruction execution logic block 50 in the AX unit. The pipeline/instruction execution logic block 50, depending upon the final or intermediate result of the execution of a given instruction in the pipeline, advises the address and instruction block 51 which instruction (expected to be stored in the cache 48 which is the equivalent of the private cache 25 shown in FIG. 2) should now be sent to a set of instruction buffers 58 in anticipation of being sent via an instruction bus 60 to be entered into the pipeline and/or which operand (expected to be stored in the cache 48) should be sent to the pipeline/instruction execution logic block 50. As previously noted, the pipeline/instruction execution logic block 50 may obtain a result which is stored as an operand in the cache 48 via a result bus 70. Those skilled in the art will understand that, if a requested instruction or operand is not found in the cache 48, the shared cache 22 will be accessed, but such is irrelevant to the present invention and is ignored in the following discussion.

Figure 8:
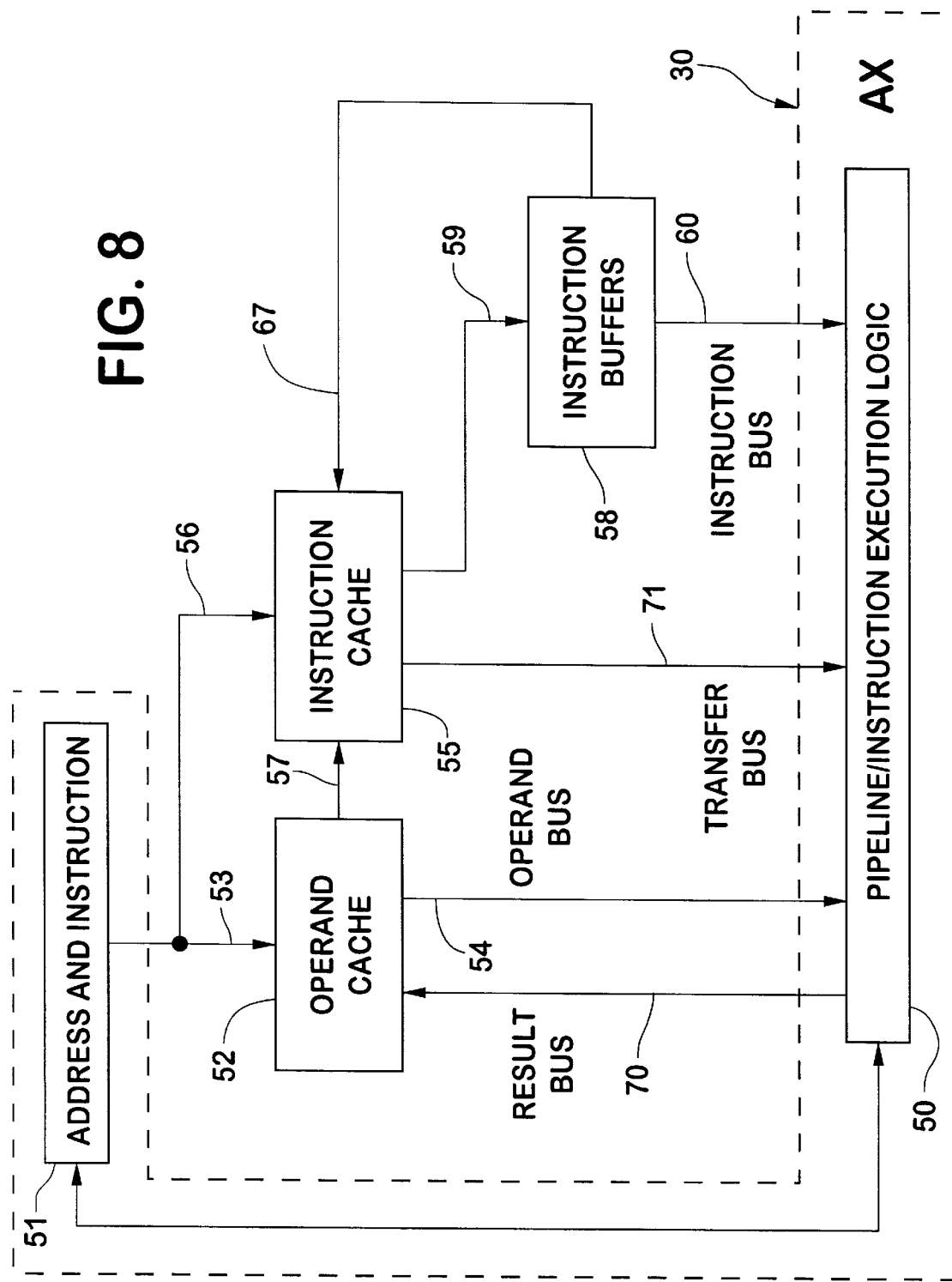
FIG. 8 is a high level block diagram illustrating an exemplary embodiment of the present invention.

Attention is now directed to FIG. 8 which is a high level block diagram of the relevant apparatus incorporating first aspects of the subject invention. In common with the prior art structure shown in FIG. 7, the cache structure shown in FIG. 8 receives address and instruction information from address and instruction block 51 of the AX 30 unit and sends operands, instructions and transfer information to pipeline/instruction execution logic block 50 in the AX unit. However, the structure shown in FIG. 8 incorporates separate operand and instruction caches.

Still referring to FIG. 8, the pipeline/instruction execution logic block 50, depending upon the final or intermediate result of the execution of a given instruction in the pipeline, advises the address and instruction block 51 which instruction (expected to be stored in an instruction cache 55) should now be sent to the set of instruction buffers 58 in anticipation of being sent via instruction bus 60 to be entered into the pipeline and/or which operand (expected to be stored in an operand cache 52) should be sent to the pipeline/instruction execution logic block 50.

When the pipeline/instruction execution logic 50 determines that a conditional transfer has been met, i.e., that a GO condition exists, the address and instruction block queries both the instruction cache 55 and the operand cache 52 for the presence of the target instruction of the transfer. (An instruction, for example, one that has been built up in AX, may reside in the operand cache.) If there is a hit in the instruction cache 55, the target instruction is sent to the pipeline/instruction execution logic on the transfer bus 71. At the same time, the sub-block (a group—e.g., four words—of contiguously addressed instructions constituting a fraction of an addressable block—e.g., of sixteen words) containing the target instruction is transferred to the instruction buffers 58 via internal bus 59, and priority of access will be changed to favor this transferred sub-block. Thus, AX accesses instructions from the instruction bus 60, but upon the presence of a GO for a transfer instruction, the target instruction is pulled from the transfer bus 56, and the next succeeding instructions will be pulled from the just-transferred sub-block via the instruction bus 60.

If the operand cache 52 receives a hit on a transfer GO and the instruction cache 55 does not, then the instruction cache allocates the block containing the target instruction, and a copy of the block is moved from the operand cache to the instruction cache. Then, the sequence of operation is as described above for a hit in the instruction cache.

The first time an instruction is pulled from any of the last four locations of an instruction buffer, a request is made to the instruction cache 55 via line 67 for the next sequential sub-block which is loaded into a new instruction buffer such that, if the current buffer runs out without a transfer GO being executed, then the new buffer becomes the current buffer for supplying instructions to the pipeline/instruction execution logic 50 via the instruction bus 60.

Figure 9:
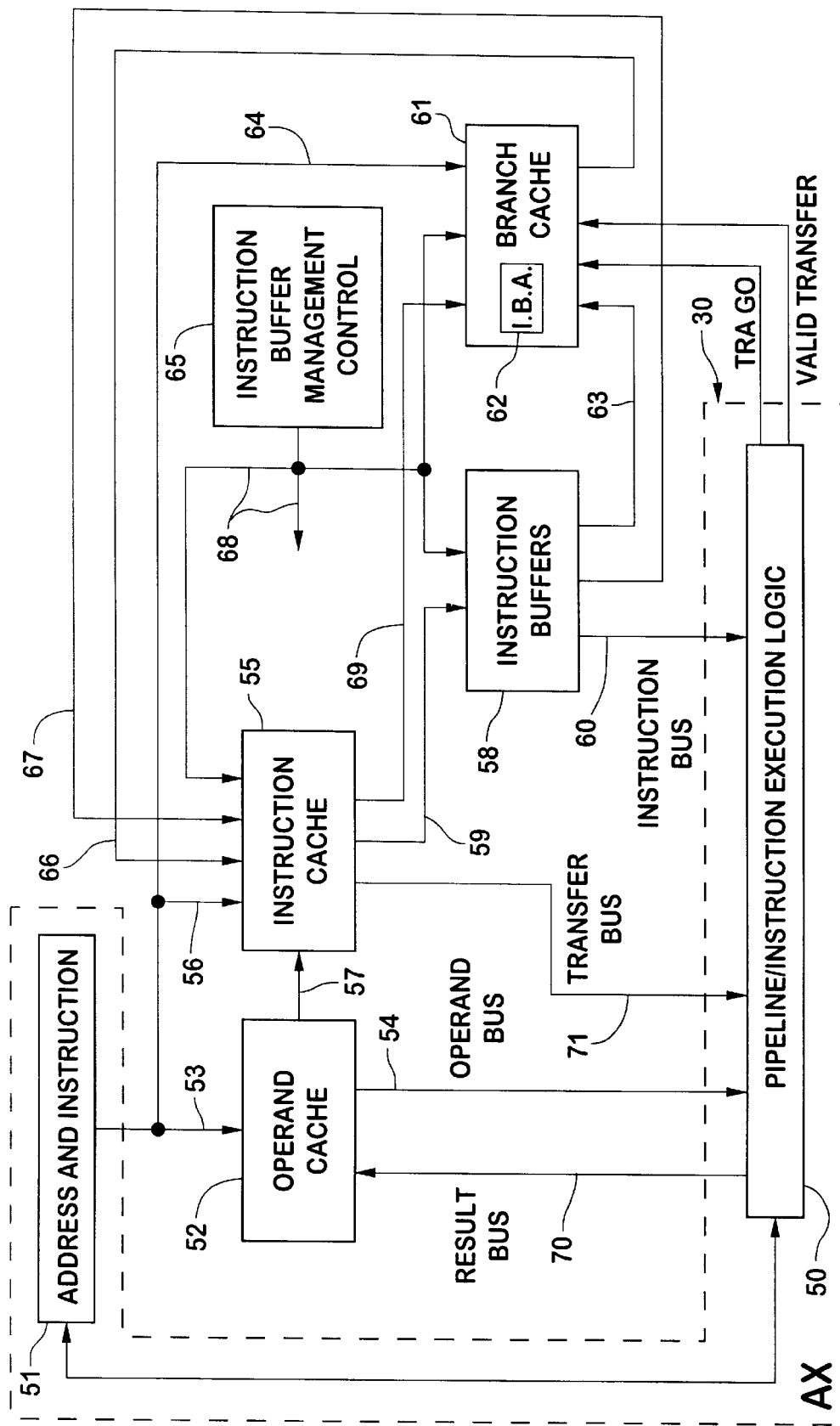
FIG. 9 is a more detailed block diagram illustrating an exemplary embodiment of the present invention.

Attention is now directed to FIG. 9 which is a more complete block diagram of the subject invention and further showing a branch cache 61 incorporated into the cache structure. It should be noted that the use of cache structure including an operand cache 52, an instruction cache 55, instruction buffers 58 and a branch cache have been described in the prior art in similar environments. However, as will become apparent as the discussion proceeds, the interrelationship between and communications among those elements according to the invention is unique and results in distinctly improved performance. Further, the branch cache 61, which will be discussed in detail in conjunction with FIGS. 10 and 10B, is distinctly different in structure and operation from that of known branch caches. It will be particularly noted that the branch cache 61 incorporates an instruction buffer adjunct 62.

Thus, still referring to FIG. 9, in addition to the instruction bus 60, additional second and third outputs from the instruction buffers 58 respectively wrap back to the instruction cache 55 via lines 67 and are applied as one input to the branch cache 61 via lines 63. The branch cache 61 also receives second and third inputs respectively from a second output from the instruction cache 55 via lines 69 and from the address and instruction block 65 via lines 68. Further, the branch cache 61 receives information from the AX unit 30 via lines 64 along with TRA-GO and Valid Transfer signals. The output from the branch cache 61 wraps back to a third input to the instruction cache 55 via lines 66. (As will be described in conjunction with FIG. 10, another output from the branch cache 61 wraps back to its own input logic.) The logical transfer of information among the several elements of the structure shown in FIG. 9 is under the control of instruction buffer management control block 65, via numerous control lines 68.

Figure 10A:
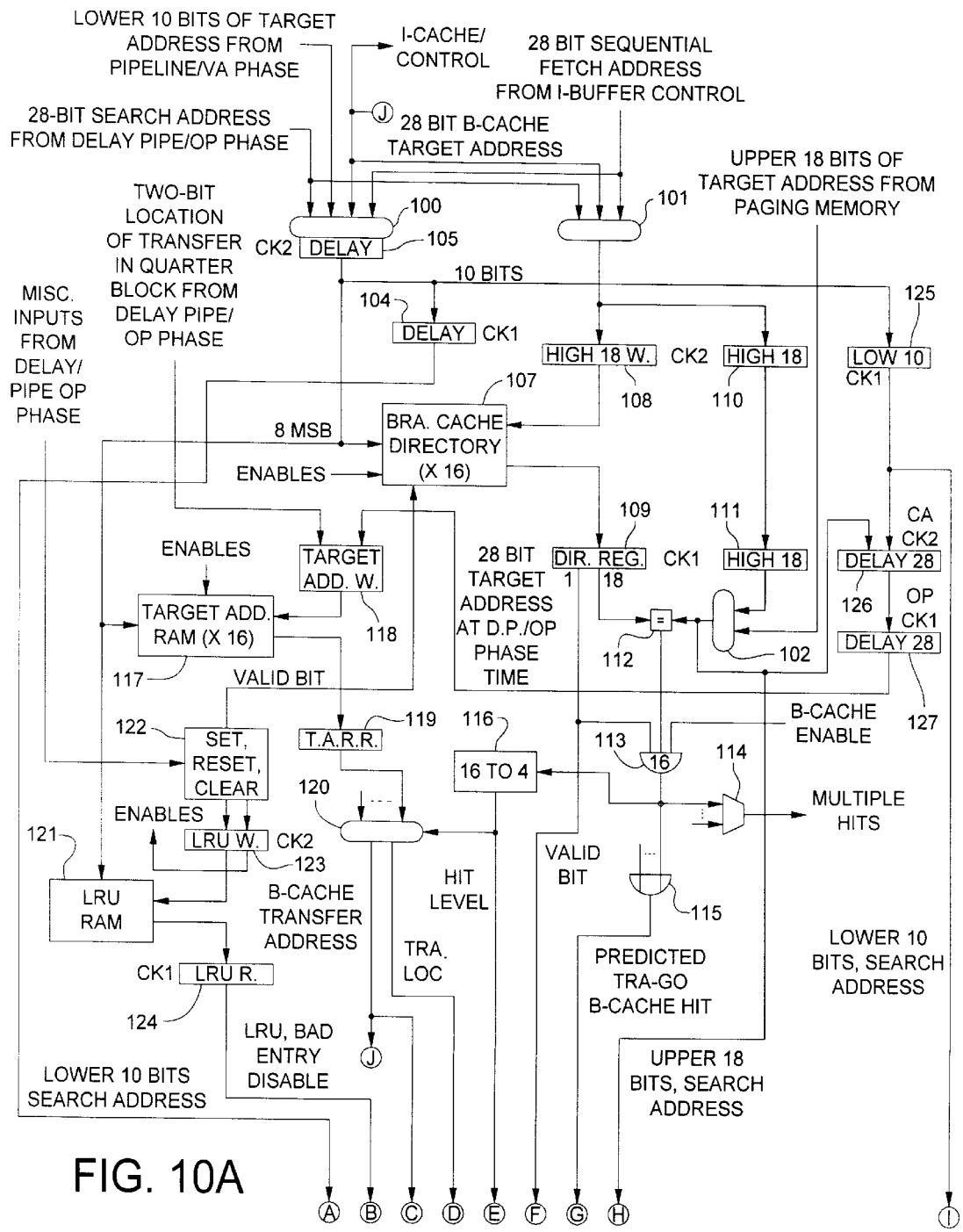
FIG. 10, constituting FIGS. 10A and 10B taken together, is a detailed logic diagram of a presently preferred embodiment of the present invention.
Figure 10B:
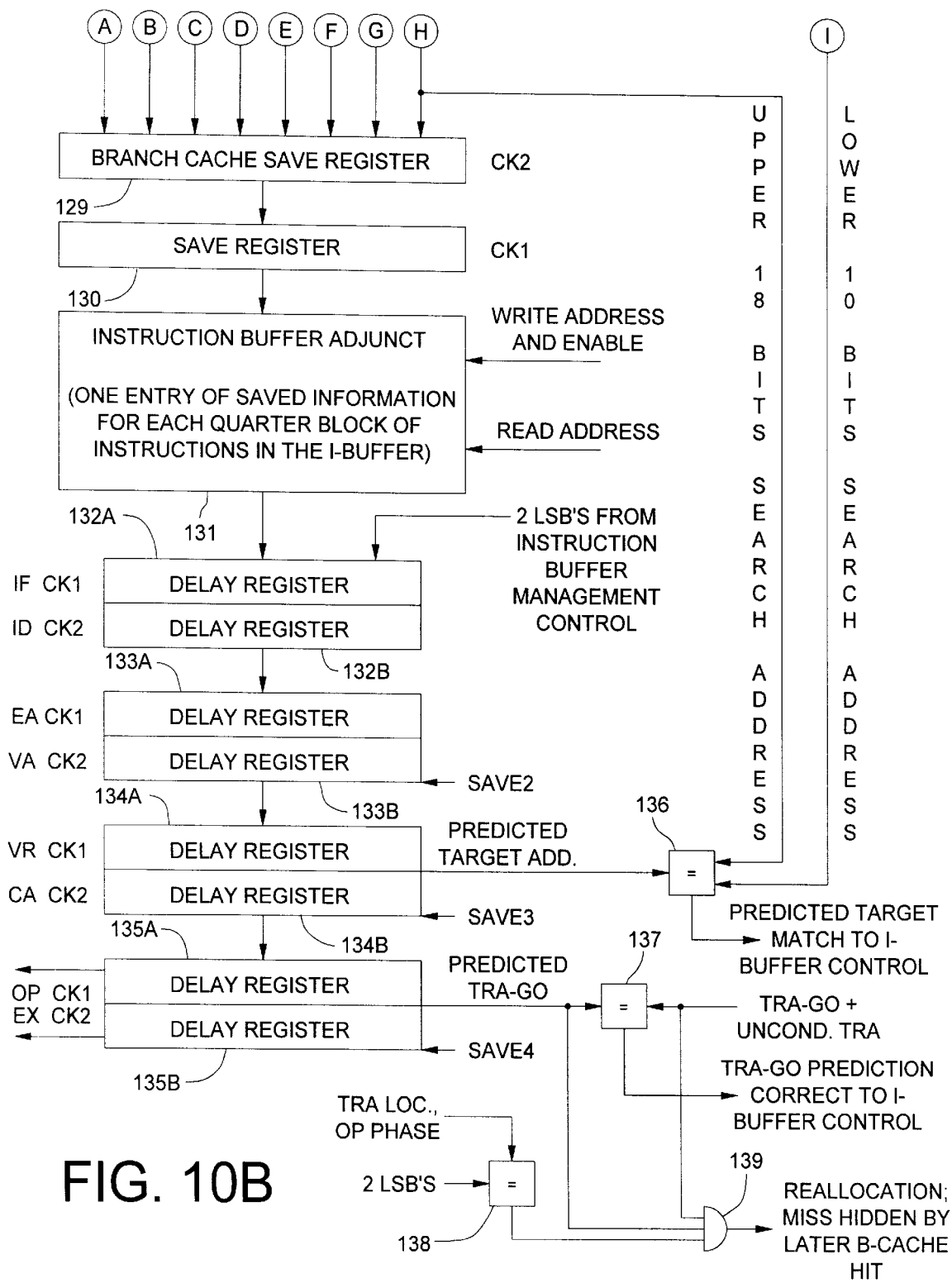

Attention in now directed to FIG. 10 (FIGS. 10A and 10B taken together) which is a slightly simplified (for example, parity considerations are omitted) logic diagram showing a presently preferred implementation of the subject branch cache invention. Connectors A through I shown in FIGS. 10A and 10B are merely for the purpose of connecting the two logic diagram sheets which cannot be presented on a single sheet, and connector J serves to represent a connection otherwise awkward to incorporate into FIG. 10A.

In considering the intricate logic circuitry of FIG. 10, it is useful to have an appreciation of the philosophy of the invention. The invention takes advantage of certain programming techniques which are typically employed in quality coding and also takes statistical analysis into account. In the environment of the present invention, it can be shown that, on the average, a transfer (sometimes called a branch) instruction will occur about once every quarter block of four instructions. Further, with the use of good coding and compilation techniques, the target instruction of a transfer instruction (which itself contains the address of the target) will often be found at a nearby address. Still further, a target may itself be a transfer instruction which includes the internal target address of its target—an instruction which may also be found at a nearby address. Thus, it often, but not always, happens that the target of a transfer in the pipeline is, itself, already in the instruction buffers. If a target of a TRA-GO from the pipeline in AX is indeed already resident in the instruction buffers, there is no need to pull the sub-block containing the target from the instruction cache and send it to the instruction buffers; it is already there, and significant time in servicing the transfer can be saved by very quickly recognizing and taking advantage of that fact. The present invention serves to carry out this function in a highly efficient manner.

First, an overview of FIG. 10 will be presented followed by a more detailed description of the apparatus as it functions under various conditions. It will be noted that the transfers among the various logic elements are carried out synchronously under the control of a two-phase clock, CK1 and CK2 (equivalent to X1 and X2 as used earlier). Positive logic is assumed. In addition, the pipeline, while incorporating eight stages, is slightly different in the exemplary embodiment from that described earlier in this application. However, the principals of the invention are applicable to any similar pipeline environment. In the example, the pipeline has the following phases: 1) IF (instruction fetch), ID (instruction decode), EA (effective address), VA (virtual address), VR (virtual-to-real address), CA (cache access), OP (operand fetch) and EX (execution, which includes result handling).

All activity in the branch cache 61, which is shown in detail in FIG. 10, may be considered, for purposes of the following discussion, to originate at input switches 100, 101 and 102. Switch 100 selects the source of the lower ten bits of a 28-bit word address while switch 101 selects the source of the upper 18 bits of the word address in all but one instance. Switch 102 selectively uses the delayed output (through registers 110, 111) of switch 101 or the 18-bit page address directly from the cache's paging unit associative memory. It will be understood that the control signals to the switches 100, 101, 102 are supplied by the instruction buffer management control block 65 (FIG. 9).

The eight most significant bits (the quarter block address) of the lower ten address bits output from switch 100 (delayed for one clock phase in register 105) are used to address the RAM 107 (branch cache directory), the RAM 117 (target address) and the RAM 132 (least recently used—"LRU"). The branch cache directory 107 has, as inputs to be stored, 18-bit high address information from write register 108 and a valid bit signal (which can modify a "valid" field stored in the directory for each quarter block represented) from set, reset, clear logic block 122. The outputs from the branch cache directory 107 are written to an array of 16 output read registers 109 for fast access in succeeding operations to the then current contents of the directory. Similarly, the target address RAM 117 has a write register 118 and read registers 119; and the LRU RAM 121 has a write register 123 and a read register 124.

Either the upper 18 bits of the real address from the cache unit's associative paging memory via switch 102 or the upper 18 address bits from the switch 101 (originating at one of three sources) is selectively chosen and compared in comparator 112 with the upper 18 bits of each of the 16 entries currently in the branch cache directory's read registers 109. The results of these comparisons are used in a 16 wide AND-gate array 113 to develop a hit/miss condition for each level in the branch cache. The inputs to enable the AND-gate array 113 as to a given entry are:

a) the upper 18 bits of the directory entry and of the input address are equal,
b) the branch cache is enabled, and
c) the valid bit is logic "1".

The branch cache is only disabled under certain processor conditions which are not relevant to the present invention; accordingly, the branch cache enable signal to AND-gate array 113 may be assumed to be continuously at logic "1" during the following discussion.

The outputs from the AND-gate array 113 are ORed together in 16-input OR-gate 115 to form hit/miss predicted TRA-GO or TRA-NO GO) information and are also applied to a logic network 114 to detect multiple hits. In addition the 16 level hit conditions are encoded by block 116 into a "select" field of four bits which are applied to the control inputs to switch 120 and also sent to connector E.

At the same time that the directory RAM 107 is accessed, the target address RAM 117 is accessed, and its outputs are saved in the 16 target address read registers 119. The switch 120, controlled by the directory hit level, selects the appropriate one of the 16 28-bit target addresses which is folded back as an input (connector J) to switches 100, 101 reflecting that a branch cache search found another transfer go which can be used to search the branch cache again. The 28-bit target address is also saved in branch cache save register 129 (FIG. 10B—connector C). The 28-bit target address is also separately applied to the instruction cache 55 and the instruction buffer management control logic 65 (FIG. 9). Similarly, the outputs of the LRU RAM 121 from register 124 are saved in branch cache save register 129.

As will become apparent below, register 129 is one of a series of registers that save information from branch cache searches and later supply that information when expected transfers are executed in the pipeline so that branch cache entries can be made for miss cases, updated for hit cases or cleared if entries are in error (i.e., incorrect predictions). The information set saved in the register 29 for each quarter block resident in the instruction buffer is:

a) 28-bit search address (connectors H and A),
b) branch cache hit (predicted TRA-GO, one bit—connector G),
c) valid bit (one bit—connector F),
d) hit level (four bits—connector E),
e) expected location of a target within the quarter block (two bits connector D),
f) 28-bit predicted target address (connector C), and
g) LRU/bad entry disable (16 bits—connector B).

Referring also to FIG. 10B, in parallel with the branch cache search (using the upper 26 bits of the 28-bit address), an instruction cache search is made at the same address. If the instruction cache search is a hit, a quarter block of instructions is saved in the instruction buffer. At the same time that the instructions are written into the instruction buffer, the information from register 129 is delayed, in register 130, so that in can be saved in a buffer 131 which is designated as the instruction buffer adjunct (identified by reference character 62 in FIG. 9).

Thus, the information stored in the instruction buffer adjunct 131 has a one-to-one relationship with each quarter block of instructions currently resident in the instruction buffer 58 (FIG. 9) such that, for each quarter block of instructions, there is a comprehensive entry in the instruction buffer adjunct 131 with the information saved from a previous branch cache search.

The write address of the instruction buffer is used as the write address of buffer adjunct 131. When an instruction is read from the instruction buffer 58 and sent to the pipeline in AX, the corresponding entry is read from buffer adjunct 131; the read address of the instruction buffer (less the two LSBs which identify the word within the quarter block) is used as the read address of buffer adjunct 131. The output of the buffer adjunct 131 is staged down through a series of registers 132A/B, 133A/B, 134A/B and 135A/B just as the instructions from the instruction buffer are sent down the pipeline itself in AX. The holds on these registers (save2, save3, save4) are the same as used in the pipeline so that the information stays in synchronism with the progress of the instructions in the pipeline. Thus, the registers 132A/B, 133A/B, 134A/B and 135A/B serve as a delay pipe.

The processed information about past searches of the branch cache 61 which has been saved in the instruction buffer adjunct 131 is used in two ways: 1) to check the validity of predicted transfers and 2) to make/change entries in the branch cache. The predicted target address from buffer adjunct 131 is delayed until after the delay pipe VR phase (register 134A) and is then compared, in comparator 136, with the actual target address from switch 102 and register 125. The predicted TRA-GO bit is delayed until after the delay pipe OP phase (register 135A) and is matched with TRA-GO AND Unconditional Transfer in comparator 137 to verify the hit.

A special case is handled by comparator 138 and AND-gate 139. If the predicted location of a transfer go doesn't match the lower two bits of the current instruction and there is a predicted TRA-GO, then a reallocation for this entry must be carried out (a predicted TRA-NOGO before a predicted TRA-GO becomes a TRA-GO).

When entries are written into the branch cache, the information to do this also comes from registers 132A/B, 133A/B, 134A/B, 135A/B. The address for the allocation is taken from the delay pipe OP phase (register 135A) and applied to the switches 100, 101. Any changes in the directory RAM 107 data are supplied from switch 101 via write register 108 (upper 18 bits of address). In a like manner, the computed transfer target address (delayed through serially arranged registers 125, 126, 127) is placed into the target RAM 117 via write register 118. The two least significant bits that were staged through registers 132A/B, 133A/B, 134A/B, 135A/B become the new transfer location within the quarter block. The LRU, hit level, hit/miss, entry disable and valid bit are used to determine what the LRU and valid bit will be (logic block 122 based on hit/miss, miss prediction and target address prediction). The new LRU bits are placed into LRU RAM write register 123, and the new valid bits into directory RAM write register 108. The RAM write enables are written into LRU write register 123 and, during a brief period intermediate the pipeline EX phase and the succeeding pipeline IF phase, changes in the branch cache RAMs are made.

The operation of the logic shown in FIG. 10 is dynamic such that, for purposes of explaining its operation under various conditions, an assumption is made that the entries in the branch cache directory RAM 107, target address RAM 117, LRU RAM 121 and instruction buffer adjunct 131 are complete and up-to-date; i.e., as to entries which have been saved in the branch cache directory RAM, the target addresses stored in target address RAM 117 are current, and the extended information about each quarter block of instructions currently resident in the instruction buffers 58 has been stored in the instruction buffer adjunct.

Consider a first condition in which the address of a target is received as a result of the execution pipeline in AX noting that a transfer command (which includes the target address) has been fetched into the pipe with the resulting possibility that a transfer may take place if there is a hit (in the pipeline) as previously described which will result in the issuance of a TRA-GO signal. The upper 18 bits (real address from the paging memory) of the transfer address are applied to switch 102 while the lower 10 bits are applied to switch 100 from the pipeline logic itself. It will be understood that, at this time (VA for the pipeline), there is only speculation that a hit in the pipeline may take place.

The eight most significant bits of the lower 10 bits of the target address are used to address the branch cache directory 107 as well as the target address RAM 117 and the LRU RAM 121. The high 18 bits of the target address are transferred through the switch 102 and applied as one input to comparator 112 for comparison against the 16 sets of target addresses present in the directory read registers 109 (and are also sent to connector H). When the target address is from the currently discussed source, there is no immediate updating of the contents of the branch cache directory 107 and hence no immediate change to the contents of the single directory read register 109 which is subject to change.

The contents of the branch cache elements in FIG. 10 reflect the results of recent target address searches, and the target address from the currently discussed source is, in effect, "unknown" as to this recent branch cache activity. While it is statistically likely that there will be a match found between one or more of the entries in the registers 109 and the high 18 bits of the applied target address, it is possible that there will not be a hit, and this less likely sub-condition of the first condition process will be discussed first.

Therefore, it will be assumed that the comparator 112 does not find a match at this time. As a result, none of the gates in AND-gate array 113 is enabled, and the predicted TRA-GO bit (connector G) issued by the OR-gate 115 is a logic "0"; i.e., a branch cache miss is predicted, and any valid bit information (connector F) and any hit level information (connector E) is meaningless. The lower ten bits of the search address are sent to connector A (and also to connector I), the relevant target address stored in the target address RAM 117 is sent to connector C (and connector J), the predicted transfer location bits are sent to connector D and the LRU information is sent to connector B.

As a result, a complete set of entries for the quarter block in the instruction buffers corresponding to the eight bit address, supplied from the pipeline itself, applied to the branch cache directory 107, the target address RAM 117 and LRU RAM 121 is available at the inputs to the branch cache address register even though it is known that there is not going to be a branch cache hit. This activity is in anticipation of marking, for possible replacement, the currently addressed quarter block branch cache entry which is no longer of likely near-term value.

The complete 28-bit search address from the pipeline is applied to one side of a comparator 136. Earlier, when the transfer instruction was read from the instruction buffer to the pipeline, the same read address was used to start the data set pertaining to the quarter block down the delay pipe constituting registers 132A/B, 133A/B, 134A/B and 135A/B (along with the two LSBs from the instruction buffer management control identifying each word within the quarter block). As a result, after the "VR" phase of the delay pipe, a previously predicted transfer address from the data set can be compared, in the comparator 136, to the current search address. In the example being discussed, there will not be an address match which ends consideration that the predicted address will prove to be correct. The transfer target, already also addressed in the instruction cache, will be taken from the instruction cache and sent to the pipeline in AX via the transfer bus as previously described. Therefore, the transfer, if a TRA-GO, will be serviced, but the full time required for doing so by obtaining the target from the instruction cache will be required. The service time "shortcut" of finding that the target is already in the instructions buffers and can be read immediately to the pipeline if there is a TRA-GO is not obtained for this example.

After the instruction buffer adjunct entry traversing the delay pipe has progressed through the "OP" phase, it is known that, as expected, the predicted target address was incorrect such that information is sent from the delay pipe to the set, reset, clear logic 117 reflecting this fact. In this instance, the entries in the branch cache directory 107, target address RAM 117 and instruction buffer adjunct 131 for the quarter block in the instruction buffer 58 identified by the eight bit address applied to the branch cache directory cannot be expected to be of near-term success in predicting a transfer target address and can be moved out of the branch cache. The valid bit for the entry in the branch cache directory 107 will be reset in case there is a meaningless match in the comparator 112 before the entry is replaced. The LRU is advised that the entry can be replaced and associates the entry with any other currently known no-longer-useful entries for replacement when the opportunity arises.

In the event that this same quarter block entry is addressed again before there is a chance to replace it, the valid bit read into the associated one of the registers 109 will now be logic "0" such that, even in the event that there is a match for this entry in the comparator 112 and even though there will be generated a new entry into the instruction buffer adjunct 131 and a traverse through the delay pipe, the entry will be invalidated from matching the then current search address in the comparator 136; it is merely awaiting replacement in the branch cache by a new branch cache entry.

The second, more likely sub condition of the first condition (in which it is the pipeline itself which is addressing the branch cache, will be described later.

Consider now a second example in which the branch cache (in parallel with the instruction cache) is addressed by a sequential 28-bit address from the instruction buffer management control block 68. As previously discussed, this is a common occurrence reflecting that a quarter block of instructions in the instruction buffers 58 have all been sent to the pipeline in AX, and the next sequential quarter block of instructions in the current process flow must be sent from the instruction cache 55 to the instruction buffers 58. The high 18 bits of the sequential fetch address are routed through the switch 101 and write register 108 which is the source of entries into the branch cache directory 107. The lower 10 bits are routed through switch 100, and the eight MSBs are used to address the branch cache directory 107, target address RAM 117 and the LRU RAM 121 as previously described.

The upper 18 bits of the sequential fetch address are also applied to one side of the comparator 112 via switch 102. There may or may not be a hit (or even a plurality of hits) between this address component and the branch cache directory contents in the directory registers as determined by the comparator 112. But, even if there is not a hit, there is good reason to assume, as may be shown by statistical analysis, that the quarter block just sent to the instruction buffers will contain at least one target. Accordingly, a branch cache entry should be made for this new quarter block whether or not there is a hit at the comparator 112.

Thus, assume first that, in the present example, there is not a hit at the comparator 112. As discussed for the previous miss condition, the predicted TRA-GO bit at connector G is a logic "0", and any valid bit information (connector F) and any hit level information (connector E) is meaningless. The lower ten bits of the search address are sent to connector A (and also to connector I), the target address stored in the target address RAM 117 are sent to connector C (and connector J), the predicted transfer location bits are sent to connector D and the LRU information is sent to connector B.

The corresponding previously current entry for the quarter-block still in the instruction buffer adjunct is already traversing the delay pipe as previously described although it will not be used to verify a predicted target address. When this entry has reached the OP phase, the LRU entry is used to allocate space in the branch cache directory 107 to admit the new entry from the write register 108. In the meantime, the complete 28 bit address, a potential correctly predicted target address, is separately delayed until the OP phase through delay registers 126, 127 and is then read into the target address RAM 117, along with the two-bit location in the quarter block from the delay pipe, via write register 118.

It will be understood that the 28-bit sequential fetch address is not a search address for an imminently possible TRA-GO so that the comparison in comparator 136, even if a match, does not result in a correctly predicted transfer address. The predicted TRA-GO bit, an input to comparator 137 during the OP phase of the delay pipe will not be set such that using the predicted address in inhibited.

Now, consider the case in which a 28-bit sequential fetch address results in a hit at comparator 112. The result is that all the current information which has been assembled and stored into the instruction buffer adjunct 131 is known to be meaningful and that the predicted TRA-GO bit is a logic "1". All the information previously described is assembled at the inputs to the branch cache save register 129 for transfer to the instruction buffer adjunct as a fully valid entry, ready for use when a real transfer address is received from the pipeline and paging memory.

When such a search address is received from the pipeline in the VA phase, the corresponding entry in the instruction buffer adjunct will already have started down the delay pipe during the IF phase along with the two bits supplied by the instruction buffer management control which identifies which instruction in the quarter block is the transfer instruction which caused the target search address to be sent to the branch cache (and, it will be recalled, also to the instruction cache in case there are misses at both the comparators 136 and 137).

It will be seen, then, that the branch cache is constantly refining its entries by processing both real and contemplated search addresses to track the immediately current contents of the instruction buffers and to keep corresponding information entries about each quarter block in the instruction buffers in the instruction buffer adjunct.

Returning now to the condition in which the pipeline itself has sent a transfer address to the branch cache in contemplation of a possible TRA-GO and under a second subcondition in which there is a hit at the comparator 112 indicating that the relevant entry is in the branch cache directory 107 and that the corresponding entry in the instruction buffer adjunct is already traversing the delay pipe. When the VR phase is reached, there will be a match at the comparator 136, and the instruction buffer management control block 65 is advised that there is a match to the requested target in the instruction buffers. At the OP phase, there is a check in the comparator 137 to check whether the pipeline has issued a TRA-GO (or an unconditional transfer) which matches the predicted TRA-GO in the delay pipe. If so, the instruction buffer management control block 65 is so advised. Referring also to FIG. 9, at this instant, the instruction buffer management control 65 has all the information it needs to read the target to the pipeline 50 in AX 30 directly from the instruction buffers 58 via the instruction bus 60, therefore saving the time it would otherwise take to read the quarter block of the target from the instruction cache 55 to the pipeline via the transfer bus 71.

From the foregoing, it will be understood that the logic circuitry disposed, in FIGS. 10A and 10B, above the inputs to the instruction buffer adjunct 131 can operate substantially independently of the logic circuitry disposed below the outputs from the instruction buffer adjunct such that, under most conditions, the contents of the branch cache are constantly refined and updated while the actual use of the delay pipe to predict the target of a transfer takes place at about one-fourth of the branch cache update rate.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A data processing system with a pipelined processor and a cache which includes an instruction cache, instruction buffers for receiving instruction sub-blocks from the instruction cache and providing instructions to the pipelined processor and a branch cache, said branch cache comprising:

A) an instruction buffer adjunct for storing an information set for each of sub-blocks which are currently resident in the instruction buffers, which information set includes:
   1) a search address;
   2) a predicted transfer hit/miss;
   3) a projected location of a target in a sub-block; and
   4) a predicted target address;

B) a branch cache directory for storing instruction buffer addresses corresponding to current entries in the instruction buffer adjunct;

C) a target address RAM for storing target addresses;

D) a delay pipe for selectively stepping an information set read from the buffer instruction adjunct in synchronism with a transfer instruction traversing the pipeline, which delay pipe comprises:
   1) a plurality of serially coupled registers including:
      a) a first register for receiving an instruction set from the instruction buffer adjunct concurrently with the issuance of a transfer instruction from the instruction buffers to the pipeline during a first pipeline phase;
      b) a second register for receiving the instruction set from the first register during a second pipeline phase which is later than the first pipeline phase; and
      c) a third register for receiving the instruction set from the second register during a third pipeline phase which is later than the second pipeline phase;

E) means for addressing the instruction buffer adjunct for sending a selected information set to the first register of the delay pipe when a transfer instruction is sent to the pipeline from the instruction buffers, which transfer instruction includes a target address;

F) comparison means for determining, at the third pipeline phase, if the information set traversing the delay pipe identifies, as currently resident in the instruction buffers, a target address that matches the target address in the transfer instruction traversing the pipeline; and G) selection means, responsive to a finding that the information set traversing the delay pipe identifies a target address that matches the target address in the transfer instruction traversing the pipeline, for sending the instruction identified by the target address to the pipeline from the instruction buffers.

2. The data processing system of claim 1 in which the selection means is responsive to a finding that the information set traversing the delay pipe does not include a target address that matches the target address in the transfer instruction traversing the pipeline by sending the instruction identified by the target address to the pipeline from the instruction cache.

3. The data processing system of claim 1 in which the branch cache further includes update means responsive to the sending of a new sub-block from the instruction cache to the instruction buffer for developing an information set for the new sub-block and for storing the information set for the new sub-block into the instruction buffer adjunct.

4. The data processing system of claim 2 in which the branch cache further includes update means responsive to the sending of a new sub-block from the instruction cache to the instruction buffer for developing an information set for the new sub-block and for storing the information set for the new sub-block into the instruction buffer adjunct.

5. The data processing system of claim 1 in which the selection means is further responsive to a TRA-GO signal from the pipeline such that, if there is a finding that the information set traversing the delay pipe includes a target address that matches the target address in the transfer instruction traversing the pipeline, the instruction identified by the target address is sent to the pipeline from the instruction buffers only if the TRA-GO signal is received, else the instruction identified by the target address is sent to the pipeline from the instruction cache.

6. The data processing system of claim 2 in which the selection means is further responsive to a TRA-GO signal from the pipeline such that, if there is a finding that the information set traversing the delay pipe includes a target address that matches the target address in the transfer instruction traversing the pipeline, the instruction identified by the target address is sent to the pipeline from the instruction buffers only if the TRA-GO signal is received, else the instruction identified by the target address is sent to the pipeline from the instruction cache.

7. The data processing system of claim 3 in which the selection means is further responsive to a TRA-GO signal from the pipeline such that, if there is a finding that the information set traversing the delay pipe includes a target address that matches the target address in the transfer instruction traversing the pipeline, the instruction identified by the target address is sent to the pipeline from the instruction buffers only if the TRA-GO signal is received, else the instruction identified by the target address is sent to the pipeline from the instruction cache.

8. The data processing system of claim 4 in which the selection means is further responsive to a TRA-GO signal from the pipeline such that, if there is a finding that the information set traversing the delay pipe includes a target address that matches the target address in the transfer instruction traversing the pipeline, the instruction identified by the target address is sent to the pipeline from the instruction buffers only if the TRA-GO signal is received, else the instruction identified by the target address is sent to the pipeline from the instruction cache.

9. The data processing system of claim 1 in which the sub-block containing the target address in the transfer instruction is processed as a new entry into the branch cache and an instruction set therefor is stored in the branch case adjunct.

10. The data processing system of claim 2 in which the sub-block containing the target address in the transfer instruction is processed as a new entry into the branch cache and an instruction set therefor is stored in the branch case adjunct.

11. The data processing system of claim 3 in which the sub-block containing the target address in the transfer instruction is processed as a new entry into the branch cache and an instruction set therefor is stored in the branch case adjunct.

12. The data processing system of claim 4 in which the sub-block containing the target address in the transfer instruction is processed as a new entry into the branch cache and an instruction set therefor is stored in the branch case adjunct.

13. The data processing system of claim 5 in which the sub-block containing the target address in the transfer instruction is processed as a new entry into the branch cache and an instruction set therefor is stored in the branch case adjunct.

14. The data processing system of claim 6 in which the sub-block containing the target address in the transfer instruction is processed as a new entry into the branch cache and an instruction set therefor is stored in the branch case adjunct.

15. The data processing system of claim 7 in which the sub-block containing the target address in the transfer instruction is processed as a new entry into the branch cache and an instruction set therefor is stored in the branch case adjunct.

16. The data processing system of claim 8 in which the sub-block containing the target address in the transfer instruction is processed as a new entry into the branch cache and an instruction set therefor is stored in the branch case adjunct.

17. The data processing system of claim 1 in which the sub-block is four instruction words in length.

18. The data processing system of claim 2 in which the sub-block is four instruction words in length.

19. The data processing system of claim 3 in which the sub-block is four instruction words in length.

20. The data processing system of claim 4 in which the sub-block is four instruction words in length.

21. The data processing system of claim 5 in which the sub-block is four instruction words in length.

22. The data processing system of claim 6 in which the sub-block is four instruction words in length.

23. The data processing system of claim 7 in which the sub-block is four instruction words in length.

24. The data processing system of claim 8 in which the sub-block is four instruction words in length.

25. The data processing system of claim 9 in which the sub-block is four instruction words in length.

26. The data processing system of claim 10 in which the sub-block is four instruction words in length.

27. The data processing system of claim 11 in which the sub-block is four instruction words in length.

28. The data processing system of claim 12 in which the sub-block is four instruction words in length.

29. The data processing system of claim 13 in which the sub-block is four instruction words in length.

30. The data processing system of claim 14 in which the sub-block is four instruction words in length.

31. The data processing system of claim 15 in which the sub-block is four instruction words in length.

32. The data processing system of claim 16 in which the sub-block is four instruction words in length.

\* \* \* \* \*